US012786026B2

(12) United States Patent
Chang et al.

(10) Patent No.: US 12,786,026 B2
(45) Date of Patent: Nov. 3, 2026

(54) METHOD AND APPARATUS FOR GENERATING BINARY SEQUENCE GROUP

(71) Applicant: Electronics and Telecommunications Research Institute, Daejeon (KR)

(72) Inventors: Kap Seok Chang, Daejeon (KR); Yong Sun Kim, Daejeon (KR); Won Cheol Cho, Daejeon (KR); Young-Jo Ko, Daejeon (KR); Sang Hyo Kim, Seongnam-si (KR); Ji Woong Jang, Ulsan (KR)

(73) Assignee: ELECTRONICS and TELECOMMUNICATIONS RESEARCH INSTITUTE, Daejeon (KR)

(*) Notice: Subject to any disclaimer, the term of this patent is extended or adjusted under 35 U.S.C. 154(b) by 332 days.

(21) Appl. No.: 18/542,947

(22) Filed: Dec. 18, 2023

(65) Prior Publication Data

US 2024/0214252 A1 Jun. 27, 2024

(30) Foreign Application Priority Data

Dec. 19, 2022 (KR) ........................ 10-2022-0178309
Dec. 12, 2023 (KR) ........................ 10-2023-0179754

(51) Int. Cl.

*H04L 27/26* (2006.01)
*H04L 5/00* (2006.01)
*H04L 27/20* (2006.01)

(52) U.S. Cl.

CPC ........ *H04L 27/2607* (2013.01); *H04L 5/0044* (2013.01); *H04L 27/20* (2013.01)

(58) Field of Classification Search

CPC ... H04L 27/2607; H04L 5/0044; H04L 27/20; H04L 27/2613

See application file for complete search history.

(56) References Cited

U.S. PATENT DOCUMENTS

| | | | |
|---|---|---|---|
| 7,558,309 B2 | 7/2009 | Cha et al. | |
| 8,543,151 B2 | 9/2013 | Kim et al. | |
| 8,559,480 B2 | 10/2013 | Yoon et al. | |
| 10,687,366 B2 | 6/2020 | Hui et al. | |
| 11,510,165 B2 | 11/2022 | Park et al. | |
| 2002/0012386 A1 | 1/2002 | Shanbhag | |
| 2003/0123576 A1* | 7/2003 | Cleveland | H04B 1/707 375/340 |
| 2018/0294910 A1* | 10/2018 | Kim | H04L 27/266 |
| 2020/0351061 A1* | 11/2020 | Yang | H04L 27/2636 |

FOREIGN PATENT DOCUMENTS

KR 10-2008-0073190 A 8/2008

* cited by examiner

*Primary Examiner* — Nizam U Ahmed

(74) *Attorney, Agent, or Firm* — Sughrue Mion, PLLC

(57) ABSTRACT

A method of a first communication node may comprise: generating a first sequence that is a maximal length sequence having a length of $2^n-1$ for a positive integer n; generating a second sequence having a relationship of a preferred pair with the first sequence; generating a third sequence having a relationship of a preferred pair with the first sequence and the second sequence; and generating a binary sequence group using the first to third sequences.

12 Claims, 5 Drawing Sheets

100

METHOD AND APPARATUS FOR GENERATING BINARY SEQUENCE GROUP

CROSS-REFERENCE TO RELATED APPLICATIONS

This application claims priority to Korean Patent Application No. 10-2023-0179754, filed on Dec. 12, 2023, and Korean Patent Application No. 10-2022-0178309, filed on Dec. 19, 2022, in the Korean Intellectual Property Office (KIPO), the entire contents of which are hereby incorporated by reference.

BACKGROUND

1. Technical Field

Exemplary embodiments of the present disclosure relate to a technique for generating a binary sequence group, and more specifically, to a technique for generating a binary sequence group by using three maximal length sequences.

2. Related Art

With the development of information and communication technology, various wireless communication technologies have been developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g. Long Term Evolution (LTE) communication system or LTE-Advanced (LTE-A) communication system), the 5th generation (5G) communication system (e.g. new radio (NR) communication system) that uses a frequency band (e.g. a frequency band of 6 GHz or above) higher than that of the 4G communication system as well as a frequency band of the 4G communication system (e.g. a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Such a communication system can utilize sequences, each of which is a series of numbers with a rule, for various purposes, such as acquisition of synchronization. These sequences may be classified into a singular sequence and a sequence group. Among these sequence groups, a Gold sequence may be used the most. The number of usable sequences from a Gold sequence may be similarly to its periodicity. Accordingly, the number of usable sequences may be increased by increasing the periodicity. In this case, the correlation characteristics may be deteriorated in a Gold sequence with a periodicity that is an even number. In addition, system complexity and resource usage may increase in a Gold sequence with a long periodicity.

SUMMARY

Exemplary embodiments of the present disclosure are directed to providing a method and an apparatus for generating a binary sequence group by using three maximal length sequences.

According to a first exemplary embodiment of the present disclosure, a method of a first communication node may comprise: generating a first sequence that is a maximal length sequence having a length of $2^n-1$ for a positive integer n; generating a second sequence having a relationship of a preferred pair with the first sequence; generating a third sequence having a relationship of a preferred pair with the first sequence and the second sequence; and generating a binary sequence group using the first to third sequences.

When a first sequence element index of the first sequence is t, a second sequence element index of the second sequence may be d×t, d may be an exponential function of k, k may be a positive integer defined as $0<k<n$ for n, and t may be a positive integer defined as $0 \le t < 2^n-1$.

When $2^n$ is an odd number, k may be a positive integer that has 1 as a greatest common divisor with n, and when a value of a 4-modulo operation on $2^n-1$ is 2, k may be a positive integer that has 2 as a greatest common divisor with n.

d may be defined as $2^k+1$ or $2^{2k}+2^k+1$.

The method may further comprise: mapping first modulation symbols generated by modulating the binary sequence group to N subcarriers, wherein N is a positive integer; and transmitting a first signal consisting of the mapped first modulation symbols.

The first to third sequences may be generated based on generator polynomials having a maximum degree (n+1) and a first identity for the first communication node, where N is a positive integer having a value of $(2^n-1)$.

The generating of the binary sequence group using the first to third sequences may comprise: generating first to third cyclic shift indices based on an identity of the first communication node; applying the first cyclic shift index to the first sequence; applying the second cyclic shift index to the second sequence; applying the third cyclic shift index to the third sequence; performing a binary phase shift keying (BPSK) operation on a sum of the first to third sequences to which the first to third cyclic shift indices are applied; and obtaining the binary sequence group corresponding to a result of the BPSK operation.

According to a second exemplary embodiment of the present disclosure, a method of a second communication node may comprise: receiving, from a first communication node, a signal consisting of modulation symbols generated by modulating a binary sequence group associated with a physical cell identity of the first communication node; and obtaining the physical cell identity of the first communication node from the signal by using binary sequence groups associated with physical cell identities, wherein the binary sequence groups associated with the physical cell identities are generated based on a binary phase shift keying (BPSK) operation on first, second and third sequences for the respective physical cell identities.

The obtaining of the physical cell identity of the first communication node may comprise: detecting the modulation symbols from the signal; calculating a correlation value between the modulation symbols and each of the binary sequence groups; identifying a physical cell identity of a binary sequence group with a maximum correlation value; and obtaining the identified physical cell identity as the physical cell identity of the first communication node.

The signal may include a secondary synchronization signal (SSS), and the obtaining of the physical cell identity of the first communication node may comprise: obtaining the SSS from the signal; identifying a physical identity from the obtained SSS; detecting the modulation symbols from the signal; calculating a correlation value between the modulation symbols and each of binary sequence groups associated with the identified physical identity; identifying a physical cell identity of a binary sequence group with a maximum correlation value; and obtaining the identified physical cell identity as the physical cell identity of the first communication node.

When a first sequence element index of the first sequence is t, a second sequence element index of the second sequence may be d×t, d may be an exponential function of k, k may be a positive integer defined as $0<k<n$ for n, and t may be a positive integer defined as $0 \leq t < 2^n-1$.

When $2^n$ is an odd number, k may be a positive integer that has 1 as a greatest common divisor with n, and when a value of a 4-modulo operation on $2^n-1$ is 2, k may be a positive integer that has 2 as a greatest common divisor with n.

According to a third exemplary embodiment of the present disclosure, a first communication node in a communication system may comprise a processor, and the processor may cause the first communication node to perform: generating a first sequence that is a maximal length sequence having a length of $2^n-1$ for a positive integer n; generating a second sequence having a relationship of a preferred pair with the first sequence; generating a third sequence having a relationship of a preferred pair with the first sequence and the second sequence; and generating a binary sequence group using the first to third sequences.

When a first sequence element index of the first sequence is t, a second sequence element index of the second sequence may be d×t, d may be an exponential function of k, k may be a positive integer defined as $0<k<n$ for n, and t may be a positive integer defined as $0 \leq t < 2^n-1$.

When $2^n$ is an odd number, k may be a positive integer that has 1 as a greatest common divisor with n, and when a value of a 4-modulo operation on $2^n-1$ is 2, k may be a positive integer that has 2 as a greatest common divisor with n.16.

The processor may further cause the first communication to perform: mapping first modulation symbols generated by modulating the binary sequence group to N subcarriers, wherein N is a positive integer; and transmitting a first signal consisting of the mapped first modulation symbols.

According to the present disclosure, a communication node can generate a binary sequence group with a very large group size, possessing excellent cross-correlation characteristics and cross-correlation distribution, by using three binary maximal length sequences. Additionally, according to the present disclosure, the sequence group formed using three binary maximal length sequences, as a binary sequence group, may require low hardware complexity for its generation and utilization. Furthermore, according to the present disclosure, the sequence group formed using three binary maximal length sequences can include binary Gold sequence subsets, enabling the construction of various subsets with superior correlation characteristics for multiple purposes.

DETAILED DESCRIPTION OF THE EMBODIMENTS

Figure 1:
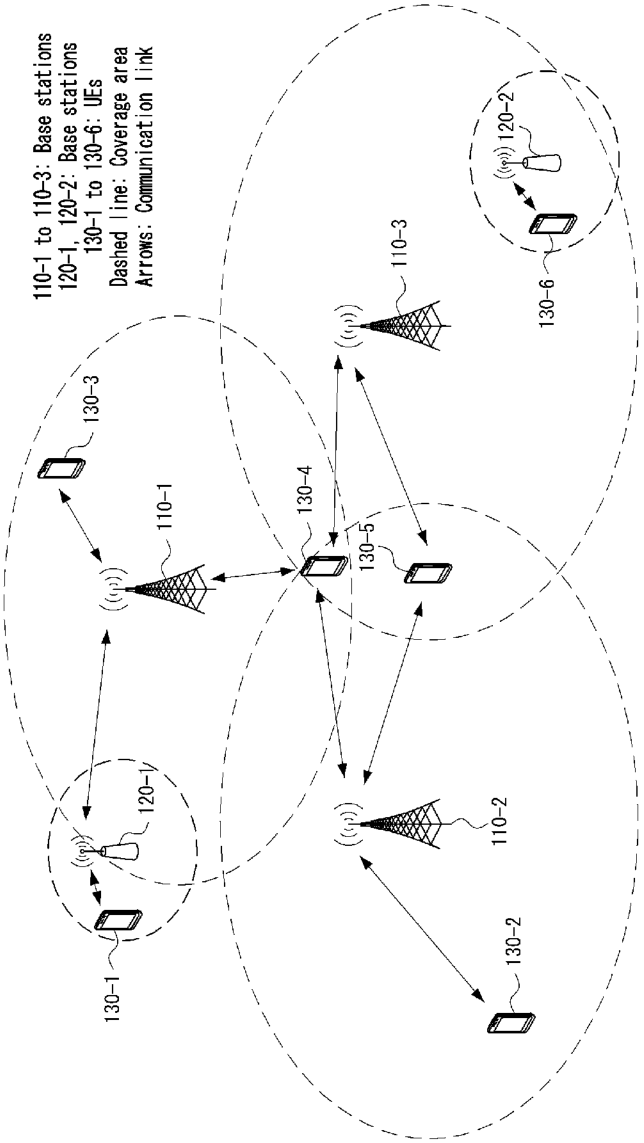
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, orthogonal frequency division multiple access (OFDMA) based communication protocol, single-carrier FDMA (SC-FDMA) based communication protocol, non-orthogonal multiple access (NOMA) based communication protocol, space division multiple access (SDMA) based communication protocol, or the like. Each of the plurality of communication nodes may have the following structure.

Figure 2:
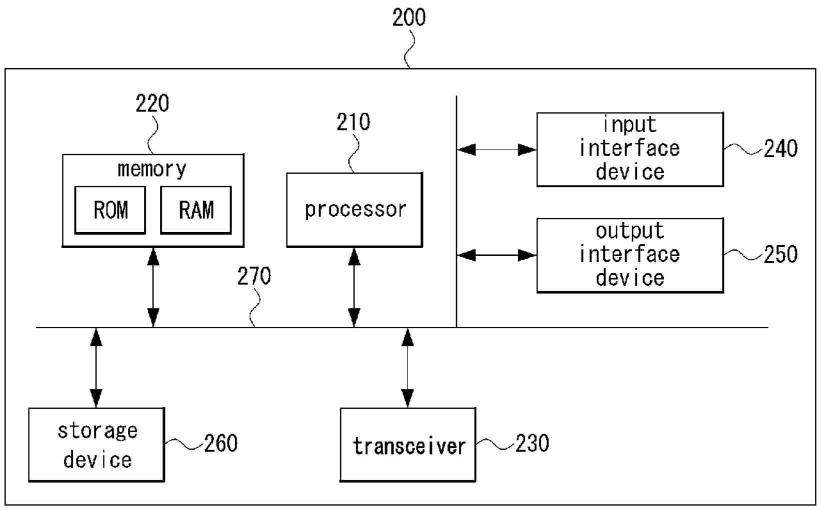
FIG. 2 is a block diagram illustrating a first exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of UEs 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third UE 130-3, and the fourth UE 130-4 may belong to the cell coverage of the first base station 110-1. Also, the second UE 130-2, the fourth UE 130-4, and the fifth UE 130-5 may belong to the cell coverage of the second base station 110-2. Also, the fifth base station 120-2, the fourth UE 130-4, the fifth UE 130-5, and the sixth UE 130-6 may belong to the cell coverage of the third base station 110-3. Also, the first UE 130-1 may belong to the cell coverage of the fourth base station 120-1, and the sixth UE 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), base transceiver station (BTS), radio base station, radio transceiver, access point (AP), access node, road side unit (RSU), digital unit (DU), cloud digital unit (CDU), radio remote head (RRH), radio unit (UR), transmission point (TP), transmission and reception point (TRP), relay node, or the like. Each of the plurality of UEs 130-1, 130-2, 130-3, 130-4, 130-5, and 130-6 may be referred to as terminal, access terminal, mobile terminal, station, subscriber station, mobile station, portable subscriber station, node, device, or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding UE 130-1, 130-2, 130-3, 130-4, 130-5, or 130-6, and transmit a signal received from the corresponding UE 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of UEs 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Such a communication system can utilize sequences, each of which is a series of numbers with a rule, for various purposes, such as acquisition of synchronization. These sequences may be classified into a singular sequence and a sequence group. Here, a singular sequence may be a single sequence and may be excellent in autocorrelation characteristics. The singular sequence may be widely used in domains such as initial synchronization or radar. In addition, a sequence group may be a set of multiple sequences and may be excellent in cross-correlation characteristics. The sequence group may be widely used to identify a specific device or user from a group, such as physical cell identity (PCI) classification in mobile communication or satellite classification in global positioning system (GPS).

Among these sequence groups, a Gold sequence may be used the most. The Gold sequence may have a periodicity of $2^n-1$ for a positive integer n. The number of usable sequences from the Gold sequence with a periodicity of $2^n-1$ may be limited to $2^n-1$, similarly to the periodicity. Due to the above-described limitation, in order to support a larger number of devices or users than the number of usable sequences from the Gold sequence, a communication system may increase the periodicity (i.e. value of n) of the Gold Sequence. In this case, the correlation characteristics of the Gold sequence may deteriorate at even numbers of n. In addition, system complexity and resource usage may increase due to the long periodicity of the Gold sequence.

To solve the above-described problem, the present disclosure proposes methods of generating a binary sequency group having a very large group size of $2^{2n}-2^{n+1}+4$ with excellent cross-correlation characteristics and cross-correlation distribution, by using three maximal length sequences (abbreviated as m-sequences) forming a preferred pair with each other and having a periodicity of $2^n-1$ for a positive integer n.

Since the newly proposed sequence group is a binary sequence group, it may have low hardware complexity for its generation and utilization. In addition, the newly proposed sequence group includes binary Gold sequence groups as subsets, and is capable of configuring various subsets with better correlation characteristics, so that it can be used for various purposes. In order to solve the problem of a binary Gold sequence group with a small group size described above, the present disclosure proposes a method and an apparatus for generating a binary sequence group with a very large group size while having excellent correlation characteristics and correlation distribution.

Figure 3:
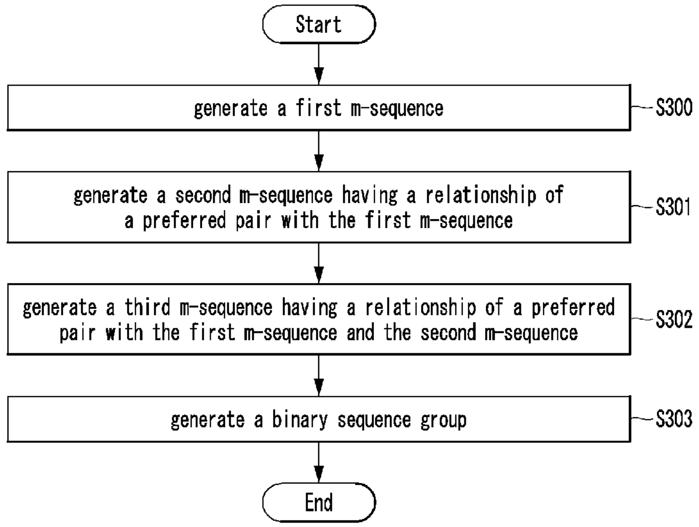
FIG. 3 is a flowchart illustrating a first exemplary embodiment of a method for generating a binary sequence group.

FIG. 3 is a flowchart illustrating a first exemplary embodiment of a method for generating a binary sequence group.

Referring to FIG. 3, in a binary sequence group generation method, a communication node may generate $x_0(t)$, which is a first m-sequence with a periodicity of $2^n-1$ for a positive integer n (S300). Additionally, the communication node may generate $x_1(t)$, which is a second m-sequence with a periodicity of $2^n-1$ for the positive integer n. The first m-sequence and the second m-sequence may have a relationship of a preferred pair as shown in Equation 1 below. Here, t may be a sequence element index, and may be defined as 0≤t<2n−1.

$$x_1(t) = x_0(dt) \quad \text{[Equation 1]}$$

Here, d may be defined as $d=2^k+1$ or $d=2^{2k}+2^k+1$. In this case, k may be a positive integer defined as 0<k<n for n, and may satisfy Equation 2 below. In other words, k may be a positive integer defined as 0<k<n for the positive integer n, may have 1 as the greatest common divisor with n for an odd number m (e.g. $m=2^n-1$), and may have 2 as the greatest common divisor with n for m having 2 as a value from a 4-modulo operation on m.

$$gcd(n, k) = \begin{cases} 1, & \text{whein } m \text{ is an odd number} \\ 2, & \text{when } (m \bmod 4) = 2 \end{cases} \quad \text{[Equation 2]}$$

Meanwhile, a cross-correlation characteristic value $R_{ij}$ of two binary sequences $x_i(t)$ and $x_j(t)$ with a periodicity of N (N is a positive integer) may be expressed as Equation 3 below. In Equation 3, + may be a binary addition operator. Here, N may be $2^n-1$.

$$R_{ij} = \sum_{t=0}^{N-1} (-1)^{x_i(t)+x_j(t)} \quad \text{[Equation 3]}$$

Then, the communication node may generate a third m-sequence $x_2(t)$ having a relationship of a preferred pair with the first m-sequence and the second m-sequence. Thereafter, the communication node may generate a first binary sequence group S using the first m-sequence, second m-sequence, and third m-sequence as shown in Equation 4 below. Here, a may be a sequence index of the first binary sequence group S. In Equation 4, + may be a binary addition operator.

$$S = \{s_a(t) | x_0(t+i) + x_1(t+j) + x_2(t+k),\ a = N^2 i + Nj + k,\ 0 \le i,j,k < N\} \quad \text{[Equation 4]}$$

The first binary sequence group S generated as described above may have the following characteristics. First, n may be 7 and the periodicity N of the first binary sequence group may be $2^7-1=127$. Additionally, for any fixed k defined as 0≤k<N, a positive integer c may be defined as 0≤c<1008. Additionally, the communication node may define the positive integer c as shown in Equation 5 below.

$$c = 3g + u,\ 0 \le g < 336,\ 0 \le u < 3. \quad \text{[Equation 5]}$$

The communication node my define a first cyclic shift index $b_0$ and a second cyclic shift index $b_1$, which are positive integers, as an example as shown in Equation 6 below.

$$b_0 = 15\left\lfloor \frac{g}{112} \right\rfloor + 5u \qquad b_1 = g \bmod 112 \quad \text{[Equation 6]}$$

The communication node may generate a second binary sequence group $S_1$ using the first m-sequence, second m-sequence, and third m-sequence as shown in Equation 7 below. Here, a may be the sequence index of the first binary sequence group S. In Equation 7, + may be a binary addition operator. In this case, the periodicity N may be defined as $N=2^7-1=127$. The second binary sequence group $S_1$ may have the same correlation characteristics as the secondary synchronization signal (SSS) used in the 5G NR system for any fixed k.

[Equation 7]

$$S1 = \{s_a(t) | x_0(t+b_0) + x_1(t+b_1) + x_2(t+k)\}.$$

The second binary sequence group may maintain its characteristics even when positions of $b_0$, $b_1$, and k in Equation 7 are changed with each other.

Meanwhile, the communication node may assume $x_0(t)$, $x_1(t)$, and $x_2(t)$ having a relationship of a preferred pair with each other and having a periodicity of $N=2^n-1$ for a positive odd number n. In this case, for any fixed k defined as $0 \le k < N$ and integers $b_0$ and $b_1$ defined as $0 \le b_0$ and $b_1 < N$, a third binary sequence group $S_2$ may be defined as Equation 8. For the third binary sequence group, a cross-correlation value between sequences within the sequence group may have a value from a set $$\left\{-1-2^{\left(\frac{n+1}{2}\right)}, -1+2^{\left(\frac{n+1}{2}\right)}-1, N\right\}.$$

[Equation 8]

$$S_2 = \{s_a(t) | x_0(t+b_0) + x_1(t+b_1) + x_2(t+k)\}.$$

The third binary sequence group may maintain its characteristics even when positions of $b_0$, $b_1$, and k in Equation 8 are changed with each other.

Meanwhile, the communication node may assume $x_0(t)$, $x_1(t)$, and $x_2(t)$ having a relationship of a preferred pair with each other and having a periodicity of $N=2^n-1$ for a positive integer n. In this case, for any fixed i and j defined as $0 \le i$ and $j < N$ and integer $b_2$ defined as $0 \le b_2 < N$, a fourth binary sequence group $S_3$ may be defined as Equation 9 below. For the fourth binary sequence group, a cross-correlation value between sequences within the sequence group may always be −1, except in cases where two sequences are the same.

[Equation 9]

$$S_3 = \{s_a(t) | x_0(t+i) + x_1(t+j) + x_2(t+b_2)\}.$$

Meanwhile, the first to fourth binary sequence groups may have, as a subset, a sequence group used as the SSS in the 5G NR system. Additionally, the first to fourth binary sequence groups may have a binary Gold sequence as a subset. Additionally, the first to fourth binary sequence groups may easily generate a subset that maintains a cross-correlation value of −1.

Meanwhile, when a communication node uses a method and apparatus for generating the first to fourth binary sequence groups, it is possible to generate a sequence group with excellent cross-correlation characteristics and a very large sequence group size. When these first to fourth binary sequence groups have a periodicity of N, they may have a sequence size N times that of the Gold sequence. Additionally, the first to fourth binary sequence groups may have, as their subsets, sequence groups and binary Gold sequences used as the SSS in the 5G NR system. Additionally, the first to fourth binary sequence groups may generate multiple subsets with a cross-correlation value of −1. In assigning PCIs to cells, the above-described characteristics can be usefully used to reduce PCI estimation performance degradation due to interference between neighbors.

Figure 4:
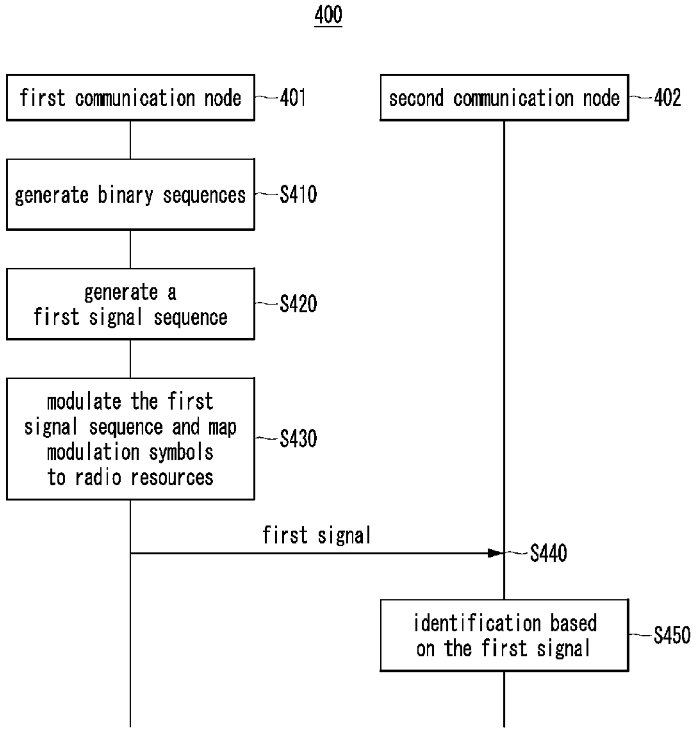
FIG. 4 is a sequence chart illustrating a first exemplary embodiment of a method for transmitting and receiving signals in a communication system.

FIG. 4 is a sequence chart illustrating a first exemplary embodiment of a method for transmitting and receiving signals in a communication system.

Referring to FIG. 4, a communication system 400 may include a plurality of communication nodes. For example, the communication system 400 may include at least a first communication node 401 and a second communication node 402. The first communication node 401 may be identical or similar to a cell (i.e. a node operating the cell) transmitting a synchronization signal. The second communication node 402 may be identical or similar to a receiving node receiving the synchronization signal.

In an exemplary embodiment of the communication system 400, the first communication node 401 may correspond to a cell, base station, network, or the like. The first communication node 401 may transmit a first signal including identification information that users (i.e. UEs, terminals, etc.) within a coverage of the first communication node 401 use to identify the first communication node 401. For example, the first communication node 401 may be identified by first identification information. The first identification information may correspond to a physical cell identity (PCI). Alternatively, the first identification information may correspond to information on the PCI. The first identification information may be generated based on the PCI. The first signal including the first identification information may correspond to a synchronization signal. The first signal may include a primary synchronization signal (PSS) and a secondary synchronization signal (SSS). However, this is merely an example for convenience of description, and the first exemplary embodiment of the method for transmitting and receiving signals in the communication system 400 is not limited thereto. The SSS of the first signal may be composed of one or more sequences (hereinafter, one or more first signal sequences). The second communication node 402 may receive the first signal transmitted from the first communication node 401. The second communication node 402 may perform identification of the first communication node 401 based on the received first signal.

Specifically, the first communication node 401 may generate one or more binary sequences (S410). Each of the one or more binary sequences may correspond to a pseudo random noise (PN) sequence. The PN sequence may be referred to as 'm-sequence'. The first communication node 401 may generate one or more first signal sequences based on the one or more binary sequences (S420).

The first communication node 401 may modulate the one or more first signal sequences generated in the step S420, and allocate (or map) them to radio resources (S430). For example, the first communication node 401 may modulate the one or more generated first signal sequences to generate one or more modulation symbols. The first communication node 401 may allocate the one or more generated modulation symbols in time resources and/or frequency resources.

The first communication node 401 may transmit to the second communication node 402 the first signal including the PSS and the SSS composed of the one or more first signal sequences modulated and mapped to the radio resources (S440). In other words, the first communication node 401 may transmit to the second communication node 402 the first signal including the PSS and the SSS consisting of the one or more modulation symbols obtained by modulating the one or more first signal sequences.

The second communication node 402 may receive the first signal transmitted from the first communication node 401 (S440). The second communication node may perform an identification operation for the first communication node 401 based on the first signal received in the step S440 (S450). The identification in the step S450 may include, for example, cell identification.

Figure 5:
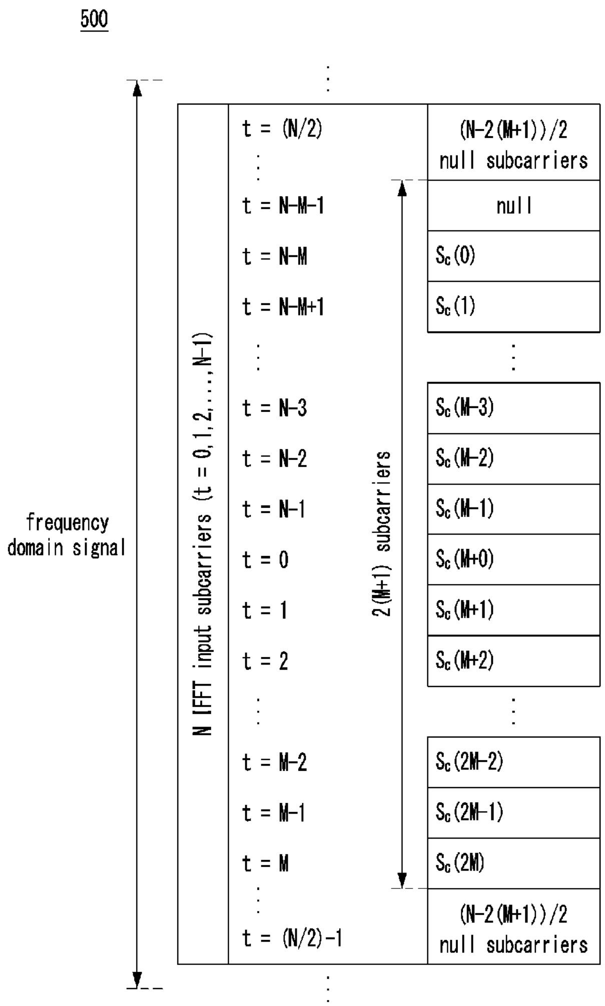
FIG. 5 is a conceptual diagram illustrating a first exemplary embodiment of a radio signal structure in a communication system.

FIG. 5 is a conceptual diagram illustrating a first exemplary embodiment of a radio signal structure in a communication system.

Referring to FIG. 5, a communication system may include a plurality of communication nodes. The communication system may be the same as or similar to the communication system 400 described with reference to FIG. 4. Hereinafter, in describing the first exemplary embodiment of the radio signal structure in the communication system with reference to FIG. 5, description redundant with those described with reference to FIGS. 1 to 4 may be omitted.

The first communication node may generate radio signals and transmit them to the second communication node. The first communication node may generate one or more radio signals. The first communication node may generate one or more radio signal sequences to generate the one or more radio signals. The first communication node may modulate one or more elements constituting the one or more generated radio signal sequences, and map them to one or more subcarriers in the frequency domain.

In an exemplary embodiment of the communication system, when the number of one or more subcarriers to which the one or more radio signal sequences are mapped is a natural number N equal to or greater than 1, an index t of the subcarriers may have a natural number ranging from 0 to N−1. In other words, t may be 0, 1, . . . , or N−1. The one or more radio signal sequences may be generated based on a predetermined identification index c. Here, the identification index c may correspond to the first identification information described with reference to FIG. 4. The identification index c may correspond to the first identification information. The identification index c may be determined based on the first identification information. Alternatively, the first identification information may be determined based on the identification index c. The one or more radio signal sequences may be expressed, for example, as $S_c(t)$. Here, t may be defined as $0 \leq t \leq 2M$. Here, 2M may be the length of the sequence (i.e. base sequence). c may be a positive integer.

In an exemplary embodiment of the communication system, a first radio signal may correspond to the first signal described with reference to FIG. 4. The first radio signal may correspond to a synchronization signal, SSS, or the like. Alternatively, the first radio signal may correspond to a newly defined signal for cell identification. The first signal may also be referred to as 'identification signal'.

In an exemplary embodiment of the communication system, the radio signal sequence $S_c(t)$ may be generated based on three binary sequences. The radio signal sequence $S_c(t)$ may be composed of 2M+1 elements (i.e. $S_c(0)$, $S_c(1)$, . . . , and $S_c(2M)$). The radio signal sequence $S_c(t)$ may be modulated and mapped to (2M+1) subcarriers. The radio signal sequence $S_c(t)$ may be referred to as 'radio signal sequence for NR'.

Referring to FIG. 5, in a first radio signal structure 500, the radio signal sequence $S_c(t)$ may be modulated and mapped to (2M+1) subcarriers indicated by the index t (i.e. t=0, 1, . . . , N−1). The (2M+1) elements (i.e. $S_c(0)$, $S_c(1)$, . . . , and $S_c(2M)$) constituting the radio signal sequence $S_c(t)$ may be respectively mapped to subcarriers with corresponding indices. Here, (2M+1) subcarriers to which the radio signal sequence $S_c(t)$ is mapped (i.e. N subcarriers to which modulation symbols obtained by modulating the radio signal sequence $S_c(t)$ are mapped) may be included in a first subcarrier group. The (2M+1) subcarriers constituting the first subcarrier group may be adjacent to or spaced apart from each other in the frequency domain. FIG. 5 illustrates a case where at least some of the (2M+1) subcarriers constituting the first subcarrier group are arranged adjacent to each other, but this is merely an example for convenience of description and the first exemplary embodiment of the radio signal structure in the communication system is not limited thereto. For example, the first subcarrier group may be composed of (2M+1) subcarriers spaced apart from each other. In other words, the first subcarrier group may be composed of N subcarriers that are not adjacent to each other.

One or more null subcarriers may be arranged around the (2M+1) subcarriers constituting the first subcarrier group. No signal may be carried in the null subcarriers. In other words, no modulation symbol may be allocated to the null subcarriers. The null subcarrier may have a value of 0. The null subcarrier may correspond to a gap subcarrier, direct current (DC) subcarrier, or the like. The null subcarrier may be arranged to easily identify the respective subcarriers.

In the frequency domain, null subcarrier(s) may be arranged at an upper side and/or lower side of the first subcarrier group. For example, null subcarrier(s) may be arranged at an upper side of a subcarrier corresponding to a subcarrier index N−M−1 and/or at a lower side of a subcarrier corresponding to a subcarrier index M. In addition, one or more null subcarriers may be arranged between the (2M+1) subcarriers constituting the first subcarrier group. For example, a null subcarrier may be arranged at an upper side and/or lower side of one or more centrally located subcarriers (hereinafter referred to as 'central subcarriers') among the (2M+1) subcarriers constituting the first subcarrier group. Alternatively, the first subcarrier group may be divided into a plurality of subgroups, each including one or more subcarriers. Null subcarrier(s) may be arranged at an upper side and/or lower side of each subgroup.

Figure 6:
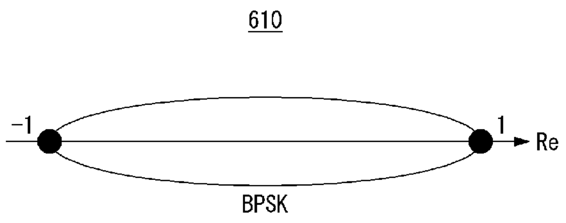
FIG. 6 is a conceptual diagram illustrating a first exemplary embodiment of a radio signal generation method in a communication system.

FIG. 6 is a conceptual diagram illustrating a first exemplary embodiment of a radio signal generation method in a communication system.

Referring to FIG. 6, a communication system may include a plurality of communication nodes. The communication system may be the same as or similar to the communication system 400 described with reference to FIG. 4. In the communication system, a radio signal may have the same or similar structure as the first radio signal structure 500 described with reference to FIG. 5. Hereinafter, in describing the first exemplary embodiment of the radio signal generation method with reference to FIG. 6, description redundant with those described with reference to FIGS. 1 to 5 may be omitted.

First Exemplary Embodiment of Radio Signal Generation Method

In an exemplary embodiment of the communication system, the first communication node may generate a radio signal according to the first exemplary embodiment of the radio signal generation method. The first exemplary embodiment of the radio signal generation method may be referred to as 'Binary Phase Shift Keying (BPSK) scheme'. The first exemplary embodiment of the radio signal generation method may be referred to as 'random BPSK scheme'.

In the first exemplary embodiment of the radio signal generation method, a first radio signal may be generated based on one or more base sequences. Here, the base sequences may be identical to a binary sequence group. The one or more base sequences may be generated based on one or more binary sequences. In other words, the one or more base sequences may correspond to a result of converting the one or more binary sequences according to the first exemplary embodiment of the radio signal generation method. For example, each of the one or more binary sequences may correspond to a PN sequence or binary PN sequence. Each of the one or more binary sequences may correspond to an m-sequence. Alternatively, each of the one or more binary sequences may be configured as a Gold sequence generated through an element-wise exclusive-OR (XOR) operation on three different PN sequences.

In an exemplary embodiment of the communication system, the base sequence $S_c(t)$ may be generated based on three binary sequences $x_0(t)$, $x_1(t)$, and $x_2(t)$. For example, the base sequence $S_c(t)$ may be defined identically or similarly to Equation 10. Here, t is an integer and may be 0, 1, . . . , or 2M. Here, $b_0$ and $b_1$ may be expressed in Equation 6, and $b_2$ may be an integer defined as $0 \le b_2 < N$. Here, N=2M+1.

[Equation 10]

$$S_c(t) = [1 - 2x_0([t + b_0]_{127})][1 - 2x_1([t + b_1]_{127})][1 - 2x_2([t + b_2]_{127})]$$

$$[x_0(6)\ x_0(5)\ \ldots\ x_0(1)\ x_0(0)] = [0\ 0\ 0\ 0\ 0\ 0\ 1]$$

$$[x_1(6)\ x_1(5)\ \ldots\ x_1(1)\ x_1(0)] = [0\ 0\ 0\ 0\ 0\ 0\ 1]$$

$$[x_2(6)\ x_2(5)\ \ldots\ x_2(1)\ x_2(0)] = [0\ 0\ 0\ 0\ 0\ 0\ 1]$$

In Equation 10, $[a]_b$ may mean a b-modulo operation on a value of a. N may mean the number of one or more subcarriers to which the first radio signal is mapped in the frequency domain. For example, in Equation 10, N may be 127. The three first binary sequences $x_0(t)$, $x_1(t)$, and $x_2(t)$ may be defined based on different generator polynomials. The three first binary sequences $x_0(t)$, $x_1(t)$, and $x_2(t)$ may be determined based on recurrence equations '$x_0(t)=x_0(t-7) \oplus x_0(t-3)$', '$x_1(t)=x_1(t-7) \oplus x_1(t-6)$', and '$x_2(t)=x_2(t-7) \oplus x_2(t-6) \oplus x_2(t-5) \oplus x_2(t-4)$', respectively. The XOR operation $\oplus$ of each recurrence equation may be the same as or similar to a 2-modulo operation. In other words, the XOR operation $\oplus$ on a linear feedback shift register (LFSR) of each recurrence equation may correspond to a 2-modulo operation. The identification index c may be determined based on a function 'c=3g+u' with g and u as input variables. Here, g may correspond to a cell group identity (CGI), and u may correspond to a physical identity (PID).

$\Xi$ may mean the number of distinguishable identification index c values. In an exemplary embodiment of the communication system, the value of the identification index c may be selected between 0 and $\Xi-1$. When c=19 is selected, it may correspond to a case where $g_0=1$ and $g_1=6$ based on Equation 6. In addition, this may correspond to a case where g=3 and u=1. In Equation 10, the equation '$S_c(t)=[1-2x_0([t+b_0]_{127})][1-2x_1([t+b_1]_{127})][1-2x_2([t+b_2]_{127})]$' for calculating the base sequence $S_c(t)$ based on the three binary sequences $x_0(t)$, $x_1(t)$, and $x_2(t)$ may correspond to a BPSK operation. The base sequence $S_c(t)$ may have values of a real number 1 or −1.

FIG. 6 shows the base sequence $S_c(t)$ generated based on Equation 10 in the first exemplary embodiment of the radio signal generation method or an exemplary embodiment of constellation for the first radio signal (hereinafter, 'basic constellation 610') generated based on the base sequence $S_c(t)$. The first radio signal may be expressed as two constellation points on the basic constellation 610. The two constellation points corresponding to the first radio signal may both have a real number 1 or −1.

Figure 7:
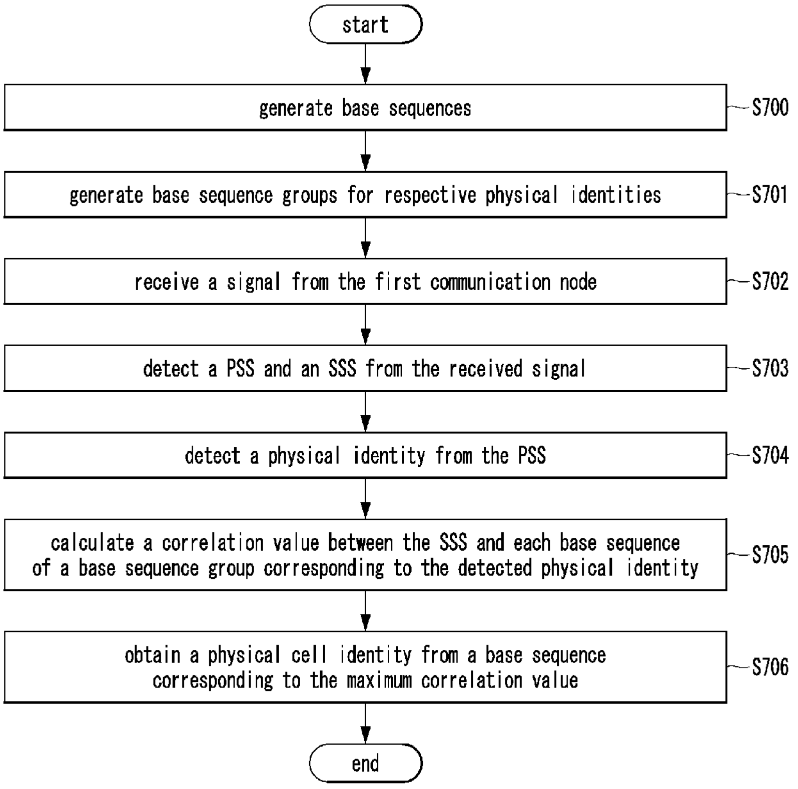
FIG. 7 is a flowchart illustrating a first exemplary embodiment of a method for detecting cell identification information in a communication system.

FIG. 7 is a flowchart illustrating a first exemplary embodiment of a method for detecting cell identification information in a communication system.

Referring to FIG. 7, the second communication node may generate base sequences using the radio signal generation method according to the first exemplary embodiment (S700). In this case, the second communication node may generate base sequence groups by classifying base sequences corresponding to each of physical identities (S701).

Meanwhile, the first communication node may transmit a first signal consisting of a PSS and an SSS comprising the base sequence $S_c(t)$ to the second communication node in the time domain. Accordingly, the second communication node may receive the first signal consisting of the PSS and the SSS including the base sequence (S702).

The second communication node may detect the PSS and the SSS from the first signal received from the first communication node (S703). The second communication node may detect a physical identity from the detected PSS (S704). Thereafter, the second communication node may calculate a correlation value between the SSS and each of the base sequences included in the base sequence group corresponding to the detected physical identity (S705). Then, the second communication node may obtain a physical cell identity corresponding to a base sequence with the maximum correlation value (S706).

As another method, the second communication node may generate base sequences using the radio signal generation method according to the first exemplary embodiment. The first communication node may transmit a first signal consisting of a PSS and an SSS comprising the base sequence $S_c(t)$ to the second communication node in the time domain. Accordingly, the second communication node may receive the first signal consisting of the PSS and the SSS including the base sequence.

The second communication node may detect the SSS from the first signal received from the first communication node. The second communication node may calculate a correlation value between the SSS and each of the base sequences (S705). Then, the second communication node may obtain a physical cell identity corresponding to a base sequence with the maximum correlation value.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a first communication node, comprising:

generating a first sequence, wherein the first sequence that is a first maximal length sequence having a length of $2^n-1$ for a positive integer n;

generating a second sequence, wherein the second sequence that is a second maximal length sequence having a relationship of a preferred pair with the first sequence;

generating a third sequence, wherein the third sequence that is a third maximal length sequence having a relationship of a preferred pair with the first sequence and the second sequence;

generating a binary sequence group using the first to third sequences;

generating first modulation symbols by modulating the binary sequence group; and transmitting, to a second communication node, a first signal including a secondary synchronization signal based on the first modulation symbols, wherein when a first sequence element index of the first sequence is t, a second sequence element index of the second sequence is d×t, d is an exponential function of k, k is a positive integer defined as $0<k<n$ for n, and t is a positive integer defined as $0\le t<2^n-1$.

2. The method according to claim 1, wherein when $2^n$ is an odd number, k is a positive integer that has 1 as a greatest common divisor with n, and when a value of a 4-modulo operation on $2^n-1$ is 2, k is a positive integer that has 2 as a greatest common divisor with n.

3. The method according to claim 1, wherein d is defined as $$2^k+1 \text{ or } 2^{2k}+2^k+1.$$

4. The method according to claim 1, wherein the transmitting the first signal including the secondary synchronization signal based on the first modulation symbols comprises:

mapping the first modulation symbols generated by modulating the binary sequence group to N subcarriers, wherein N is a positive integer; and transmitting the first signal consisting of the mapped first modulation symbols.

5. The method according to claim 4, wherein the first to third sequences are generated based on generator polynomials having a maximum degree (n+1) and a first identity for the first communication node, where N is a positive integer having a value of $(2^n-1)$.

6. The method according to claim 1, wherein the generating of the binary sequence group using the first to third sequences comprises:

generating first to third cyclic shift indices based on an identity of the first communication node;

applying the first cyclic shift index to the first sequence;

applying the second cyclic shift index to the second sequence;

applying the third cyclic shift index to the third sequence;

performing a binary phase shift keying (BPSK) operation on a sum of the first to third sequences to which the first to third cyclic shift indices are applied; and obtaining the binary sequence group corresponding to a result of the BPSK operation.

7. A method of a second communication node, comprising:

receiving, from a first communication node, a signal including a secondary synchronization signal based on modulation symbols generated from a binary sequence group detecting the secondary synchronization signal from the signal;

obtaining a physical cell identity of the first communication node based on a correlation between the detected secondary synchronization signal and binary sequence groups associated with physical cell identities; and performing communication for the first communication node based on the physical cell identity, wherein the binary sequence groups associated with the physical cell identities are generated based on a binary phase shift keying (BPSK) operation on first, second and third sequences for the respective physical cell identities, the first sequence that is a first maximal length sequence, the second sequence that is a second maximal length sequence and the third sequence that is a third maximal length sequence, wherein when a first sequence element index of the first sequence is t, a second sequence element index of the second sequence is d×t, d is an exponential function of k, k is a positive integer defined as $0<k<n$ for n, and t is a positive integer defined as $0\le t<2^n-1$.

8. The method according to claim 7, wherein the obtaining of the physical cell identity of the first communication node comprises:

detecting the modulation symbols from the signal;

calculating a correlation value between the modulation symbols and each of the binary sequence groups;

identifying the physical cell identity of the binary sequence group with a maximum correlation value; and obtaining the identified physical cell identity as the physical cell identity of the first communication node.

9. The method according to claim 7, wherein when $2^n$ is an odd number, k is a positive integer that has 1 as a greatest common divisor with n, and when a value of a 4-modulo operation on $2^n-1$ is 2, k is a positive integer that has 2 as a greatest common divisor with n.

10. A first communication node in a communication system, comprising a processor, wherein the processor causes the first communication node to perform:

generating a first sequence, wherein the first sequence that is a first maximal length sequence having a length of $2^n-1$ for a positive integer n;

generating a second sequence, wherein the second sequence that is a second maximal length sequence having a relationship of a preferred pair with the first sequence;

generating a third sequence, wherein the third sequence that is a third maximal length sequence having a relationship of a preferred pair with the first sequence and the second sequence; and generating a binary sequence group using the first to third sequences, generating first modulation symbols by modulating the binary sequence group; and transmitting, to a second communication node, a first signal including a secondary synchronization signal based on the first modulation symbols, wherein when a first sequence element index of the first sequence is t, a second sequence element index of the second sequence is d×t, d is an exponential function of k, k is a positive integer defined as $0<k<n$ for n, and t is a positive integer defined as $0 \leq t < 2^n-1$.

11. The first communication node according to claim 10, wherein when $2^n$ is an odd number, k is a positive integer that has 1 as a greatest common divisor with n, and when a value of a 4-modulo operation on $2^n-1$ is 2, k is a positive integer that has 2 as a greatest common divisor with n.

12. The first communication node according to claim 10, wherein in the transmitting the first signal including the secondary synchronization signal based on the first modulation symbols, the processor causes the first communication node to perform:

mapping the first modulation symbols generated by modulating the binary sequence group to N subcarriers, wherein N is a positive integer; and transmitting the first signal consisting of the mapped first modulation symbols.

* * * * *